INVENTOR.
Alpheus A. Franklin

INVENTOR.
Alpheus A. Franklin 3,283,488
ROTARY SAFETY BLADE
Alpheus A. Franklin, Dallas, Tex., assignor to The Atlantic Refining Company, Philadelphia, Pa., a corporation of Pennsylvania
Filed May 1, 1963, Ser. No. 277,368
3 Claims. (Cl. 56—295)

The present invention relates to mowing machines. More particularly the present invention relates to improved cutters for rotary mowing machines of the type utilizing a cutter rotating in a horizontal plane about a vertical shaft.

Mowing machines of the rotary type conventionally utilize a flat, substantially rectangular blade with the leading edges of the blade sharpened and the blade rotating about a vertically-disposed shaft. In this type of mower the subject blade rotates at an extremely high speed and the combination of this high speed plus the sharpening of the leading edges of the blade results in efficient cutting of grass. However, such mowers have been found to be extremely dangerous, both to the operator and bystanders, due to the fact that foreign objects lying in the grass are struck by the blade and are quite often thrown outwardly with sufficient force and speed to cause serious injuries.

It is, therefore, an object of the present invention to provide a novel and improved cutter for rotary mowers having a high degree of safety.

A more specific object of the present invention is to provide a novel and improved circular cutter for rotary mowers having a substantially increased degree of safety.

Another object of the present invention is to provide a novel and improved circular cutter for rotary mowers having a substantially reduced tendency to propel foreign objects outwardly.

These and other objects of the present invention will be more apparent from the following detailed description when read in conjunction with the accompanying drawings, wherein.

Figure 1A:
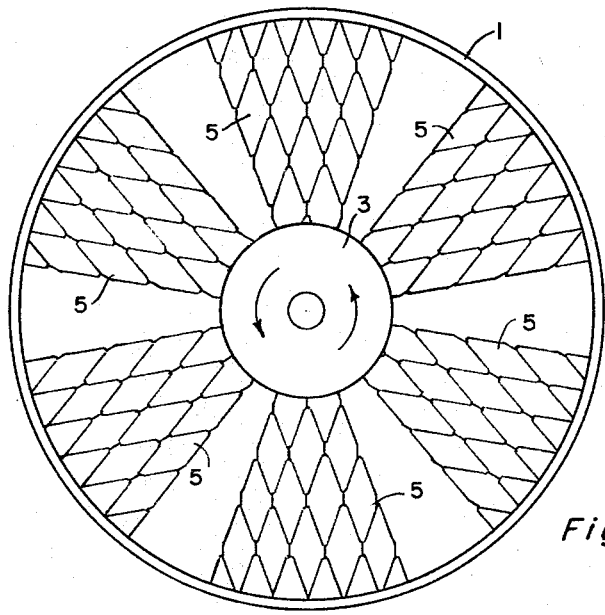
FIGURE 1a is a plan view of the bottom of one form of cutter made of expanded metal in accordance with the present invention.
Figure 1B:
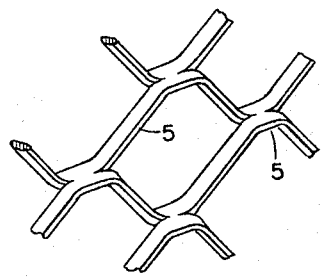
FIGURE 1b is an enlarged perspective of a portion of the expanded metal cutter and FIGURE 1c is a fragmented edge view of the cutter.
Figure 1C:
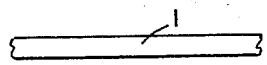

Referring specifically to FIGURES 1a, 1b, and 1c the improved cutter of the present invention is composed of a peripheral ring portion 1 which forms the outer circumference of the cutter and a central hub portion 3 adapted for attachment to a vertically-disposed shaft of a rotary mower. Connecting ring portion 1 to hub portion 3 are radially-disposed cutting elements 5 consisting of one or more slender metal elements, such as, narrow metal strips or rods or wires. Specifically, in the embodiment shown, cutting elements 5 are made up of a plurality of generally pie-shaped sections or sectors of expanded metal. Cutting elements 5 are formed so as to present substantially straight edges at their leading edges (with respect to the direction of rotation of the cutter), which straight edges are parallel to the radii of the cutter. The general configuration of the trailing edges of cutting elements 5 is immaterial but in all instances must be spaced a sufficient distance ahead of the leading edge of the next cutting element to permit grass to enter the void spaces and be struck by the leading edges of cutting elements 5. If this space is not sufficient, the cutting efficiency of the cutter will be greatly reduced and in effect, will simply roll over the grass without doing a great deal of cutting. Considering the speed with which the cutter rotates, it is unnecessary that cutting elements 5 be sharpened on their leading edge but these cutting elements should be sufficiently thin that they will effectively cut grass. Cutting elements 5 are welded or otherwise attached to ring portion 1 and hub portion 3 of the cutter and generally form a flat disc when so assembled. The fact that ring portion 1 presents an unbroken, noncutting periphery is the main factor leading to the safety of the present cutter. With this particular configuration, as opposed to a flat horizontal bar or a disc having cutting elements projecting from its periphery, the cutter of the present invention will not throw foreign objects outwardly but instead will strike them a glancing blow or spin them in a stationary position.

Figure 2:
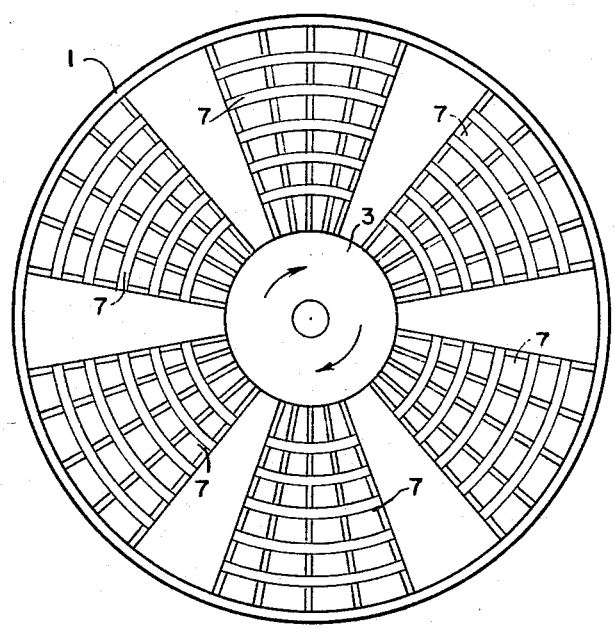
FIGURE 2 illustrates a top view of a second form of cutter made in accordance with the present invention in which the cutting elements are of a different structure.

FIGURE 2 shows a modification of the cutter of FIGURE 1. The cutter of FIGURE 2 is made up of ring portion 1 and hub portion 3. Connecting ring portion 1 to hub portion 3 are a plurality of generally pie-shaped sections or sectors of wire grill 7 which act as cutting elements. It is obvious that any particular configuration of wire grill may be employed and the particular pattern of joining the wires shown in FIGURE 2 is not critical.

Figure 3:
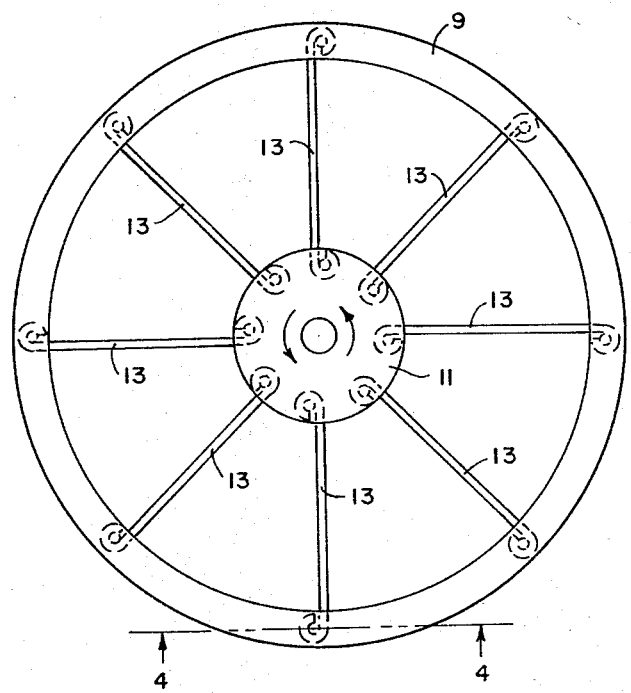
FIGURE 3 shows still another variation of the cutter of the present invention with still different cutting elements.
Figure 4:
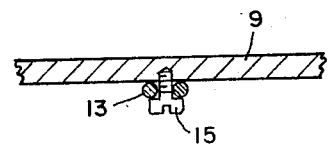
FIGURE 4 is an enlarged cross-sectional view of the cutter of FIGURE 3 taken along the line 4—4.

FIGURES 3 and 4 of the drawings show still another modification of the cutter of the present invention. In accordance with FIGURE 3 the cutter is made up of an annular ring portion 9 and a hub portion 11. Ring portion 9 is a flat ring having sufficient width for attachment of the hereinafter-mentioned cutting elements. Connecting ring portion 9 to hub portion 11 are a plurality of straight wire cutting elements 13. Wires 13 in this particular embodiment are sufficient in number and in rigidity to rigidly connect ring portion 9 to hub portion 11. In addition, as shown in greater detail in FIGURE 4, wire cutters 13 are removably attached to ring portion 9 and hub portion 11 by means of screws 15 or other means adapted to permit the removal and replacement of cutting elements which may become broken.

Figure 5:
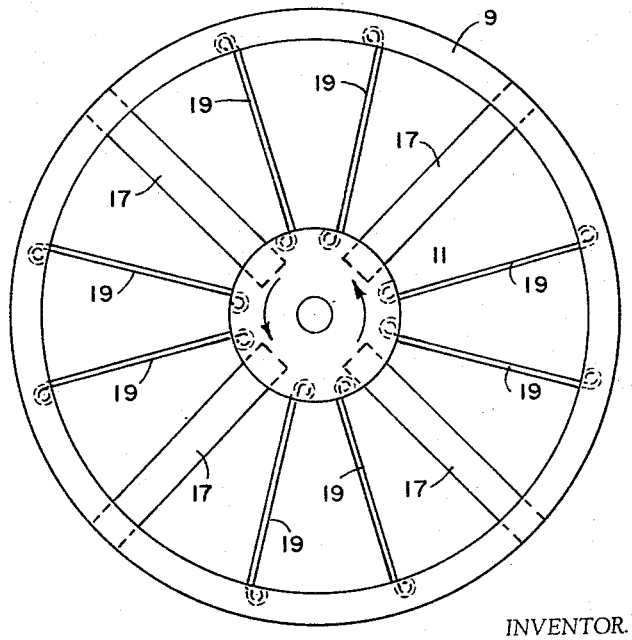
FIGURE 5 illustrates another form of cutter manufactured in accordance with the present invention and having a modified body structure.

In accordance with FIGURE 5 of the drawings, the cutter is made up of ring portion 9 and hub portion 11. Connecting ring portion 9 to hub portion 11 are spoke-type support elements 17 which rigidly connect ring portion 9 to hub portion 11. Radially-disposed on the cutter are wire cutting elements 19 which are held under tension between ring portion 9 and hub portion 11. In this particular instance, wire cutting elements 19 are thin wires, such as piano wire, stretched taut and removably attached in a manner similar to that shown in FIGURE 4. It is also to be observed that wire cutting elements 19 alone are incapable of rigidly holding hub portion 11 to ring portion 9 and, accordingly, support elements 17 are necessary for this purpose.

It will be obvious from the prior description that other modifications and variations of the present invention will occur to those skilled in the art. Accordingly, the present invention is limited only in accordance with the claims which follow.

I claim:

1. An improved cutter for rotary mowers adapted to rotate in a substantially horizontal plane about a vertically-disposed shaft comprising a hub portion adapted for attachment to said vertically-disposed shaft, a peripheral flat metal ring surrounding and spaced from said hub portion, said ring having an unbroken outer circular noncutting edge forming the outer circumference of said cutter, a plurality of spoke-type support elements connecting said hub portion to said ring, a plurality of cutting elements consisting of normally flexible wires drawn taut between said hub portion and said ring to form substantially straight cutting edges parallel to the radii of said cutter, said cutting elements being spaced about said cutter and being separated by a distance sufficient to permit grass to enter the space between said cutting elements, and said hub and ring and cutting elements forming a generally flat disc-shaped cutter.

2. An improved cutter for rotary mowers adapted to rotate in a substantially horizontal plane about a vertically-disposed shaft comprising a hub portion adapted for attachment to said vertically-disposed shaft, a peripheral metal ring surrounding and spaced from said hub portion, said ring having an unbroken outer circular non-cutting edge forming the outer circumference of said cutter, a plurality of spaced sectors made of expanded metal connecting said hub portion to said ring, said sectors having a leading edge and a trailing edge with respect to the direction of rotation of said cutter and being spaced about said cutter with the leading edge of each sector spaced from the trailing edge of the adjacent sector by a distance sufficient to permit grass to enter the void spaces between said sectors, said sectors being sufficient in number and in rigidity to rigidly connect said ring to said hub, each of said leading edges being substantially straight and parallel to the radii of said cutter, thereby forming cutting edges and said hub and ring and sectors forming a generally flat disc-shaped cutter.

3. An improved cutter for rotary mowers adapted to rotate in a substantially horizontal plane about a vertically-disposed shaft comprising a hub portion adapted for attachment to said vertically-disposed shaft, a peripheral metal ring surrounding and spaced from said hub portion, said ring having an unbroken outer circular non-cutting edge forming the outer circumference of said cutter, a plurality of spaced sectors made of wire grill connecting said hub portion to said ring, said sectors having a leading edge and a trailing edge with respect to the direction of rotation of said cutter and being spaced about said cutter with the leading edge of each sector spaced from the trailing edge of the adjacent sector by a distance sufficient to permit grass to enter the void spaces between said sectors, said sectors being sufficient in number and in rigidity to rigidly connect said ring to said hub, each of said leading edges being substantially straight and parallel to the radii of said cutter, thereby forming cutting edges and said hub and ring and sectors forming a generally flat disc-shaped cutter.

References Cited by the Examiner
UNITED STATES PATENTS

| | | | |
|---|---|---|---|
| 1,336,257 | 4/1920 | Muzzy | 56—25.4 |
| 1,341,894 | 6/1920 | Freeman | 146—124 |
| 2,295,922 | 9/1942 | Weston | 146—76 X |
| 2,557,598 | 6/1951 | Daggett | 56—25.4 |
| 2,706,372 | 4/1955 | Blydenburgh | 56—25.4 |
| 2,762,188 | 9/1956 | Klein | 56—295 |
| 3,059,400 | 10/1962 | Plummer | 56—295 |
| 3,068,633 | 12/1962 | Taylor | 56—295 |
| 3,096,608 | 7/1963 | Williamson | 56—295 |

ABRAHAM G. STONE, *Primary Examiner.*

RUSSELL R. KINSEY, C. W. ROBINSON, ANTONIO F. GUIDA, T. GRAHAM CRAVER, *Examiners.*

R. J. BAYNHAM, *Assistant Examiner.*